United States Patent Office 3,772,252
Patented Nov. 13, 1973

3,772,252
METHOD OF PREPARING SMALL PARTICLES OF A SOLID POLYMER
Harry W. Blunt, Hockessin, Del., assignor to Hercules Incorporated, Wilmington, Del.
No Drawing. Filed May 17, 1972, Ser. No. 254,294
Int. Cl. C08g 53/03
U.S. Cl. 260—75 T         5 Claims

ABSTRACT OF THE DISCLOSURE

Small particles of a normally solid polymer are prepared by emulsifying in water a solution of the polymer and adding to this emulsion a water immisicible organic liquid which is miscible with the polymer solvent but which is itself a nonsolvent for the polymer. The polymer solvent is thus extracted out of the emulsified polymer solution droplet and the polymer is liberated as a particle having substantially the same spherical shape as the droplet. The method works most effectively with normally solid thermoplastic polyesters to form spherical particles suitable as powder coatings.

---

This invention relates to the art of preparing small particles of solid polymeric materials.

In many applications where polymeric materials are employed, it is advantageous to have the polymer in the form of relatively small particles. This is particularly the case when the intended use is as a fusion coating material to be applied in the solid state as, e.g., by dispersion or fluid bed techniques. Particles of about 50 microns or less in diameter and of a relatively uniform size promote the application of smooth coatings of uniform thickness. It is also known that the smaller the size of the particles, the thinner the continuous, pin hole free coating that can be applied. In most cases, thinner coatings are economically advantageous but if this is not the case in a specific instance, it is usually a relatively simple matter to apply a second coat to increase the thickness to the desired level while experiencing the advantages of the small particles relative to smoothness and the thickness uniformity of the coating.

The preparation of small particles of solid polymers has always been something of a challenge to the polymer chemist. The ideal technique would be to develop a method of direct polymerization to the desired particle size. This has not been possible, however, except in a few isolated instances. Generally, the techniques employed have involved either comminution, as by grinding, or solution precipitation. Grinding is difficult and expensive, particularly with the tough polymers which are desired for coatings with good impact resistance.

In the solution precipitation technique, a solution of the polymer is emulsified in a liquid which is a nonsolvent for both the polymer and its solvent. When emulsification is complete, the solvent is evaporated, leaving small particles of polymer suspended in the emulsification liquid. This technique has been employed extensively for several commercially important materials, e.g., cellulose nitrate. With other materials, e.g., polyesters, the method has not been satisfactory due to a tendency for the polymer particles to agglomerate during the stripping operation. There has thus been no real alternative to grinding of the polyester.

It is the objective of this invention to provide small particles of solid polymer by a method which avoids many of the problems encountered with the above mentioned prior art methods. This method involves obtaining the polymer in fine particle form from the emulsified solution by addition of an incompatible nonsolvent for the polymer rather than by solvent stripping. The method of the invention comprises the steps of:

(a) dissolving said polymer in a water-immisicible organic solvent,
(b) emulsifying the resultant solution in water, forming an oil-in-water emulsion,
(c) adding to said oil-in-water emulsion a water-immiscible organic liquid which is miscible with the organic solvent but which is a nonsolvent for the polymer; and
(d) recovering the polymer particles from the resultant mixture of liquids.

The method is particularly useful with thermoplastic polyesters as these polymers are not processable at all using the conventional solution precipitation techniques and are unsatisfactorily treated by grinding. The polyesters which can be treated can be homopolymers prepared from a single dibasic acid and a single polyol or they can be copolymers of more than one dibasic acid with one or more difunctional alcohols. In substantially all cases, one of the dibasic acids will be terephthalic acid or a hydrogenated terephthalic acid while the second is an aliphatic dicarboxylic acid preferably having the formula HOOC $(CH_2)_n$—COOH where $n$ is at least 6 and preferably about 6 to 12. Representative aliphatic dicarboxylic acids are suberic, sebacic, azelaic, dodecanedioic, undecanedioic and decanedioic. A preferred difunctional alcohol is ethylene glycol and this is present in most polyesters. Other diols can be used either exclusively or in mixtures with or without ethylene glycol. Other diols which can be employed include trimethylene glycol, 1,4-butane diol, neopentyl glycol, propylene glycol, tetramethylene glycol, hexamethylene glycol and similar diols. A particularly preferred polyester is one having about 40 to 44 mole percent terephthalic acid units, 10 to 6 azelaic acid units, 5 to 13 mole percent neopentyl glycol units and 37 to 45 mole percent ethylene glycol units.

In carrying out the process of this invention, the critical step which differentiates the invention from prior art solution precipitation methods is in separating the polymer from the solvent by addition to the emulsion of a nonsolvent for the polymer rather than by stripping the solvent. This technique results in extraction of the solvent out of the polymer solution droplets. Extraction permits the particle to retain in large measure the spherical shape which is characteristic of the emulsified solution droplet.

As stated, the solvent and nonsolvent employed must be (a) miscible with each other and (b) immiscible with water. Most polyesters are soluble in one or more of the following exemplary water-immiscible solvents; toluene, xylene, cyclohexanone, 2-nitro-propane, tetrachloroethane, methylene chloride, chloroform, ethylene chloride, trichloroethylene, and trichlorophenol. The nonsolvent can be any water-immiscible organic liquid which is miscible with the solvent. In most cases an aliphatic hydrocarbon such as hexane or heptane will be satisfactory. It is understood, however, that this solvent listing is not intended to be limitative of the invention. Any solvent-nonsolvent pair which meets the above stated miscibility requirements can be used.

It will be apparent that the emulsion in which the polymer solution is suspended must be of the oil-in-water type, i.e., the water must be in the continuous phase. This condition can be assured by several means but the most reliable way is by selection of the most suitable emulsifier. Generally speaking, oil-in-water emulsions are prepared with water-soluble emulsifiers. The emulsifier can be of the cationic, anionic or nonionic type so long as it is water-soluble. Typical emulsifiers that can be employed are ethylene oxides, ethylene oxide sulfonates, alkylphenoxy sulphonates.

The concentration of polymer in the solution to be emulsified is not especially critical so long as it is high enough to be commercially practical by productivity consideration and not so great that the solution viscosity will impede its being reduced to droplets during emulsification. The precise definition of these limits, is, of course, determined by the polymer molecular weight. For most polyesters a concentration between about 5 and 20% is usually satisfactory.

Polymer particle size can be varied over a relatively wide range. For most applications it will be desirable to have particles of about 50 microns or less. The lower limit of operability is about ½ micron. Particle size will be affected by the design of the agitator employed due to the shear characteristics of the flow pattern induced thereby. Other factors being equal for a specific design of the agitator, the particle size is affected by the agitator speed with increasing agitator speed decreasing the particle size. Likewise, lower concentrations of polymer solution, lower polymer solution viscosity, and increased level of emulsifier can all lead to smaller particle size product.

In addition to preparing small particle polymer, the method also leads to formation of spherical particles. This is advantageous in many applications, particularly so in the powder coatings. Spherical particles pack better than do irregularly shaped particles upon application to a substrate, leading to more uniform coatings application. Additionally, spherical particles exhibit better bulk flow properties. A powder comprised of spherical particles is more easily fluidized than is one comprised of irregularly shaped particles and acts more like a pourable liquid than like a solid. Spherical particles can also be more uniformly pigmented by dry blending techniques.

In preparing the particles according to the process of the invention, the polymer solution can be made up containing all of the essential ingredients of a coating formulation. In this way, these ingredients become incorporated into the polymer particles upon removal of solvent and the particle will be a complete coating composition without any further compounding. Having been prepared from a homogeneous solution, these particles will be substantially uniform in composition. This aids in the application of highly uniform coatings. Typical of the ingredients which can be incorporated into these particles are pigments, leveling aids and stabilizers.

The invention is demonstrated by the following examples. Parts and percentages are by weight unless otherwise indicated.

EXAMPLE 1

A copolyester material was prepared which consisted of about 40 mole percent of terephthalic acid, 10 mole percent of azelaic acid, 16 mole percent of neopentyl glycol and 34 mole percent ethylene glycol units. This copolyester was dissolved in methylene chloride to form a 5% solution. The solution was emulsified in twice its volume of water containing 0.5%, based on the weight of the organic phase, of a common laboratory soap.

The emulsion was stirred vigorously using a high shear Cowles agitator, and while agitating, 2 volumes of heptane per volume of methylene chloride was slowly added. After addition of about ⅓ of the heptane, the emulsion began to break and small particles of polymer precipitated. The particles were recovered by filtration. Examination revealed that the particles were spherical in shape, and predominantly between about 1 and 10μ in diameter.

EXAMPLE 2

A copolyester material comprised of 41 mole percent terephthalic acid units, 9 mole percent azelaic acid, 38 mole percent ethylene glycol units and 12 mole percent neopentyl glycol units was dissolved in methylene chloride to form a 13% solution. To this solution was added 23% by weight, based on the polyester of $TiO_2$ dispersed in heptane (50 weight percent $TiO_2$).

The copolyester solution was added with vigorous agitation to 3 times its volume of distilled water containing 0.2% by weight of an emulsifier comprised of an ammonium salt of a sulfate ester of an alkylphenoxypoly-(ethyleneoxy) ethanol. Agitation was provided by a Cowles blade agitator at 1200 r.p.m. After about 10 minutes stirring, an oil-in-water emulsion was formed having an average emulsion particle size of about 20 microns. At this point an additional 0.2%, based on the weight of water, of the emulsifier was added and agitation was continued until this was uniformly distributed throughout the emulsion.

Heptane was added to the emulsion at 50 ml. per minute until the emulsion broke and the polymer particles fluocculated. Substantially all of the pigment was incorporated into the polymer particles. The particles were filtered out of the liquid and washed twice with heptane, three times with distilled water and finally once more with heptane. They were then dried for sixteen hours at 40° C. in a vacuum oven.

The recovered particles were spherical in shape and had a particle size ranging between about 10 and 24 microns.

EXAMPLE 3

The procedure substantially according to Example 2 was repeated except that the agitation was carried out at 2140 r.p.m. The particle size was between about <1 and 10μ.

Particles prepared according to this invention, as stated hereinabove, are especially suitable as powder coating materials. They can be applied by any of the conventional methods known in the art, such as electrostatic methods, fluid bed, and dispersion coating applied by e.g., spraying or doctor blades. Other applications for particles prepared according to this invention include, e.g., use as flattening agents, organic fillers and thickeners.

The ratio of nonsolvent to solvent employed in the solvent removal step need only be sufficient to assure that all of the solvent is removed. Generally at least about 2 volumes of nonsolvent per volume of solvent will be needed. For economic reasons it is preferred not to use any greater volume than is necessary.

The following example demonstrates the use of the particles of this invention in the coatings application discussed above.

EXAMPLE 4

The copolyester particles prepared in Example 2 were applied to a steel panel by means of an electrostatic spray with the particles negatively charged and the panel positively charged. The coating was fused at 205° C. for about 7 minutes, then cooled in air. A uniformly colored, glossy, white panel having 60° gloss value of greater than 100 resulted. The coating was shown to be continuous and pin-hole free when tested with a 2000 volt DC spark tester.

What I claim and desire to protect by Letters Patent is:
1. A method of preparing spherical small particles of a normally solid polyester condensation polymer which comprises:
   (a) dissolving said polymer in a water-immiscible organic solvent,
   (b) emulsifying the resultant solution in water, forming an oil-in-water emulsion,
   (c) adding to said oil-in-water emulsion a water-immiscible organic liquid which is miscible with the organic solvent but which is a non-solvent for the polymer; and
   (d) recovering polymer particles from the resultant mixture of liquids.

2. The method according to claim 1 wherein a pigment is added to the solution prepared in step (a).

3. The method according to claim 1 wherein the polyester is a copolyester based on terephthalic acid, a dibasic aliphatic carboxylic acid having at least 8 carbon atoms and ethylene glycol.

4. The method according to claim 3 wherein the polyester is comprised of about 40 to 44 mole percent terephthalic acid units, 10 to 6 mole percent azelaic acid units, 5 to 13 mole percent neopentyl glycol units and 45 to 37 mole percent ethylene glycol units.

5. The method according to claim 1 wherein the organic solvent is methylene chloride and the nonsolvent is heptane.

References Cited

UNITED STATES PATENTS

| 2,945,840 | 7/1960 | Roberts, et al. | 260—75 T |
| 3,115,476 | 12/1963 | Agens, et al. | 260—29.2 E |
| 3,244,687 | 4/1966 | Spindler | 260—94.9 |
| 3,558,576 | 1/1971 | Weller | 260—85.1 |

WILLIAM H. SHORT, Primary Examiner

W. C. DANISON, JR., Assistant Examiner

U.S. Cl. X.R.

260—29.2 E, 75 R, 96 R